(12) United States Patent
Aliakseyeu et al.

(10) Patent No.: US 11,405,999 B2
(45) Date of Patent: Aug. 2, 2022

(54) DETERMINING LIGHT SETTINGS AND/OR DAYLIGHT BLOCKER SETTINGS BASED ON DATA SIGNAL QUALITY

(71) Applicant: SIGNIFY HOLDING B.V., Eindhoven (NL)

(72) Inventors: Dzmitry Viktorovich Aliakseyeu, Eindhoven (NL); Bartel Marinus Van De Sluis, Eindhoven (NL); Mustafa Tolga Eren, Eindhoven (NL); Dirk Valentinus René Engelen, Heusden-Zolder (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/286,044

(22) PCT Filed: Oct. 7, 2019

(86) PCT No.: PCT/EP2019/077080
§ 371 (c)(1),
(2) Date: Apr. 16, 2021

(87) PCT Pub. No.: WO2020/078755
PCT Pub. Date: Apr. 23, 2020

(65) Prior Publication Data
US 2021/0360760 A1 Nov. 18, 2021

(30) Foreign Application Priority Data

Oct. 18, 2018 (EP) ..................... 18201236

(51) Int. Cl.
*H05B 47/11* (2020.01)
*H05B 47/19* (2020.01)
(Continued)

(52) U.S. Cl.
CPC ......... *H05B 47/11* (2020.01); *H04B 10/0795* (2013.01); *H04B 10/516* (2013.01); *H05B 47/19* (2020.01)

(58) Field of Classification Search
CPC .... H05B 47/11; H05B 47/115; H05B 47/105; H05B 47/155; H05B 47/175;
(Continued)

(56) References Cited

U.S. PATENT DOCUMENTS

| 2002/0074480 A1* | 6/2002 | Wasserman .......... G01N 21/274 250/205 |
| 2007/0174773 A1* | 7/2007 | Abernethy ........... H05B 47/155 715/716 |

(Continued)

FOREIGN PATENT DOCUMENTS

| JP | 2011-199846 A | 10/2011 |
| JP | 2015015723 A | 1/2015 |

(Continued)

OTHER PUBLICATIONS

Hongjia Wu et al., "SmartVLC: When Smart Lighting Meets VLC", pp. 212-223. CoNEXT '17, Dec. 12-15, 2017, Incheon, Republic of Korea.

(Continued)

*Primary Examiner* — Haissa Philogene (57) ABSTRACT

A system (1) is configured to obtain a target light level, determine a first set of light settings for one or more lights (13,14,24,25) and/or a first set of daylight blocker settings for one or more daylight blockers (21,22) based on the target light level, control these devices based on the first set(s) of settings, and receive from a user device (31) information indicating a quality of a light-modulated data signal received by the user device from the one or more lights, as determined by the user device. The system is further configured to determine a second set of light settings based on the first set (Continued)

of light settings and the determined signal quality and/or a second set of daylight blocker settings based on the first set of daylight blocker settings and the determined signal quality and control these devices based on the second set(s) of settings.

15 Claims, 7 Drawing Sheets

(51) Int. Cl.
*H04B 10/079* (2013.01)
*H04B 10/516* (2013.01)

(58) Field of Classification Search
CPC .... H05B 47/165; H05B 47/18; H05B 47/185; H05B 47/19; H05B 45/20; H05B 45/30; H04B 10/116; H04B 10/516; H04B 10/0795; Y02B 20/40; G06F 21/305; G01J 1/32
See application file for complete search history.

(56) References Cited

U.S. PATENT DOCUMENTS

| 2014/0042913 | A1 | 2/2014 | Yang et al. | |
|---|---|---|---|---|
| 2014/0225512 | A1 | 8/2014 | Birru et al. | |
| 2015/0276399 | A1 | 10/2015 | Breuer et al. | |
| 2016/0037613 | A1* | 2/2016 | Laherty | H05B 47/19 |
| | | | | 315/294 |
| 2016/0360594 | A1* | 12/2016 | Chemel | H05B 47/19 |

FOREIGN PATENT DOCUMENTS

| JP | 2017-516347 A | 6/2017 |
|---|---|---|
| WO | 2016075683 A2 | 5/2016 |

OTHER PUBLICATIONS

Zhao Tian et al., "The DarkLight Rises: Visible Light Communication in the Dark", Dartmouth Computer Science Technical Report TR2016-814.

* cited by examiner

DETERMINING LIGHT SETTINGS AND/OR DAYLIGHT BLOCKER SETTINGS BASED ON DATA SIGNAL QUALITY

CROSS-REFERENCE TO PRIOR APPLICATIONS

This application is the U.S. National Phase application under 35 U.S.C. §371 of International Application No. PCT/EP2019/077080, filed on Oct. 7, 2019, which claims the benefit of European Patent Application No. 18201236.9, filed on Oct. 18, 2018. These applications are hereby incorporated by reference herein.

FIELD OF THE INVENTION

The invention relates to a system for determining light settings and/or daylight blocker settings.

The invention further relates to a method of determining light settings and/or daylight blocker settings.

The invention also relates to a computer program product enabling a computer system to perform such a method.

BACKGROUND OF THE INVENTION

Intelligent light controls have been recognized as one of the most economically viable measures to decrease energy consumption and greenhouse gas emission. Total Light Management (TLM) systems that combine automatic control of blinds and lights gained in attention due to their potential to cut lighting energy costs 30-60% dependent on the climate in commercial buildings. The main aspect of a TLM system is that it balances daylight and artificial lighting, pursuing two goals maximizing daylight (energy considerations) and maintaining a preferred light level.

Total Light Management control offers an automatic way of controlling the blinds and lights. One way of automatic blinds and lights control is achieved via sensor based continuous closed loop control. This is done in a feedback loop manner in which the interior light sensor measures the inside light level which is then compared with an interior set-point. A deviation from the interior set-point leads to blinds and lights adjustments in order to minimize this difference.

US 2014/0225512 A1 discloses such a TLM system. The TLM system disclosed in US 2014/0225512 measures individual light components, i.e. total light, electric light and external light, by using a dual-mode light sensor, and uses this information to optimally control the lighting condition to meet user requirements and reduced energy consumption. In an embodiment, the electric lights use Visible Light Communication (VLC) and the dual-mode sensor is configured to use this to distinguish electric light from external light.

In addition to the proliferation of the TLM systems, a rapid growth of LiFi, i.e. the use of light for data transmission, as a new form of connectivity which is becoming an attractive alternative to conventional Wi-Fi connectivity is expected. In LiFi, data is transmitted by modulating a light output signal of a visible or non-visible light source. LiFi is often combined with light sources that are also used for general illumination. One of the limitations of LiFi is that the light source needs to be brighter than a certain threshold. Otherwise, LiFi would not be able to operate. However, the optimal light setting for LiFi might be in conflict with the TLM system that controls blinds and lights.

SUMMARY OF THE INVENTION

It is a first object of the invention to provide a system which is able to control lights and/or daylight blockers to maintain a preferred light level while taking into account LiFi requirements.

It is a second object of the invention to provide a method which is able to control lights and/or daylight blockers to maintain a preferred light level while taking into account LiFi requirements.

In a first aspect of the invention, a system for determining light settings and/or daylight blocker settings comprises at least one processor configured to obtain a target light level, determine a first set of light settings for a set of one or more lights and/or a first set of daylight blocker settings for a set of one or more daylight blockers based on said target light level, control said set of lights based on said first set of light settings and/or said set of daylight blockers based on said first set of daylight blocker settings, receive from a user device information indicating a quality of a data signal received by said user device from one or more lights of said set of lights, said data signal being transmitted by modulating a light signal and said signal quality being determined by said user device.

Said at least one processor is further configured to determine a second set of light settings for said set of lights based on said first set of light settings and said measured signal quality and/or a second set of daylight blocker settings for said set of daylight blockers based on said first set of daylight blocker settings and said measured signal quality, and control said set of lights based on said second set of light settings and/or said set of daylight blockers based on said second set of daylight blocker settings. Said measured signal quality may comprise a signal-to-noise ratio and/or a data rate (e.g. relative to a maximum/reference data rate), for example.

By letting user devices measure the quality of the data signal and provide this as feedback to the system, which controls one or more lights and/or one or more daylight blockers, the system can use this information to both maintain a preferred light level and meet LiFi requirements. For example, even though daylight might be sufficient to achieve a preferred light level, both artificial lights and daylight blockers may be activated to achieve the same preferred light level while also allowing LiFi to be used normally.

Said at least one processor may be configured to receive from said user device further information indicating a further signal quality of a further data signal received by said user device from one or more lights of said set of lights, said further data signal being transmitted by modulating a light signal, determine a third set of light settings for said set of lights based on said first second of light settings and said further signal quality and/or determine a third set of daylight blocker settings for said set of daylight blockers based on said second set of daylight blocker settings and said further signal quality, and control said set of lights based on said third set of light settings and/or said set of daylight blockers based on said third set of daylight blocker settings.

By repeatedly letting the user devices determine, e.g. measure, the quality of the data signal and provide this as feedback to the system and by repeatedly letting the system determine the light and/or daylight blocker settings based on this information, it may be ensured that LiFi requirements are met even when user devices move, or new user devices enter the building.

Said set of lights may comprise one or more non-visible lights, e.g. one or more non-visible lights configured to emit infrared (IR) light. IR-based LiFi might be preferable for higher bandwidths or due to other advantages.

Said set of lights may include only lights transmitting a data signal. In this case, the target light level is typically a minimum or initial light level for lights transmitting a data signal. In case visible lights that do not transmit a data signal also need to be controlled, said at least one processor may be configured to obtain a target visible light level, determine said first set of light settings for said set of one or more lights and a first set of further light settings for a further set of one or more lights based on said target light level and said target visible light level, said further set of lights including only lights not transmitting a data signal, control said further set of lights based on said first set of further light settings, determine a second set of further light settings for said further set of lights based on said first set of further light settings and said determined signal quality, and control said further set of lights based on said second set of further light settings.

By using both a target light level (e.g. minimum or initial light level) for lights that transmit a data signal and a target light level for visible light (e.g. desired visible light level) instead of only a target light level for visible light, the desired quality of the data signal may be achieved quicker.

Alternatively, said set of lights may (already) include at least one light transmitting a data signal and at least one light not transmitting a data signal. In this case, the target light level is typically a minimum and/or maximum light level for visible light.

Said at least one processor may be configured to prevent a user from decreasing the amount of light blocked by said set of daylight blockers upon determining that decreasing the amount of light blocked by said set of daylight blockers would result in said signal quality of said data signal falling below a target level. Since daylight may interfere with artificial light, which may cause the signal quality of the data signal to deteriorate, preventing the users from decreasing the amount of light blocked by the set of daylight blockers helps maintain a sufficient data signal quality.

Said at least one processor may be configured to obtain a measured light level and determine said first set of light settings for said set of lights, said first set of light settings for said further set of lights, and/or said first set of daylight blocker settings for said set of daylight blockers further based on said measured light level. This is beneficial if a target light level for visible light has been defined and allows this preferred light level to be achieved more accurately. The light level may be measured, for example, at a target surface, e.g. a desk or at desk height.

Said at least one processor may be configured to control said set of lights based on said first set of light settings and/or said set of daylight blockers based on said first set of daylight blocker settings upon determining that said measured light level does not fall in a range of acceptable values. This prevents that the settings are unnecessarily changed frequently, which may be noticed by users. The settings are only changed when considered necessary.

Said at least one processor may be configured to control said set of lights based on said second set of light settings and/or said set of daylight blockers based on said second set of daylight blocker settings upon determining that said determined signal quality does not fall in a range of acceptable values. This prevents that the settings are changed frequently, which may be noticed by users. The settings are only changed when considered necessary.

Said at least one processor may be configured to determine one or more user device positions of and/or for one or more user devices receiving said data signal and/or one or more user device positions of and/or for one or more user devices not receiving said data signal, determine one or more light transmission positions of one or more lights of said set of lights and/or said further set of lights and/or of one or more daylight blockers of said set of daylight blockers, and determine said first set of light settings for said set of lights, said first set of light settings for said further set of lights and/or said first set of daylight blocker settings for said set of daylight blockers further based on said determined one or more user device positions and said determined one or more light transmission positions. This allows LiFi light sources to be dimmer or off in locations at which LiFi is not used and/or allows light sources in general to be dimmer in locations at which the target light level is low and/or allows daylight blockers to be inactive in locations at which no users (i.e. user devices) are present or at which LiFi is not required.

In a second aspect of the invention, a method of determining light settings and/or daylight blocker settings comprises obtaining a target light level, determining a first set of light settings for a set of one or more lights and/or a first set of daylight blocker settings for a set of one or more daylight blockers based on said target light level, controlling said set of lights based on said first set of light settings and/or said set of daylight blockers based on said first set of daylight blocker settings, receiving from a user device information indicating a quality of a data signal received by said user device from one or more lights of said set of lights, said data signal being transmitted by modulating a light signal and said signal quality being determined, e.g. measured, by said user device, determining a second set of light settings for said set of lights based on said first set of light settings and said determined signal quality and/or a second set of daylight blocker settings for said set of daylight blockers based on said first set of daylight blocker settings and said determined signal quality, and controlling said set of lights based on said second set of light settings and/or said set of daylight blockers based on said second set of daylight blocker settings. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: obtaining a target light level, determining a first set of light settings for a set of one or more lights and/or a first set of daylight blocker settings for a set of one or more daylight blockers based on said target light level, controlling said set of lights based on said first set of light settings and/or said set of daylight blockers based on said first set of daylight blocker settings, receiving from a user device information indicating a quality of a data signal received by said user device from one or more lights of said set of lights, said data signal being transmitted by modulating a light signal and said signal quality being determined by said user device, determining a second set of light settings for said set of lights based on said first set of light settings and said determined signal quality and/or a second set of daylight blocker settings for said set of daylight blockers based on said first set of daylight blocker settings and said determined signal quality, and controlling said set of lights based on said second set of light settings and/or said set of daylight blockers based on said second set of daylight blocker settings.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
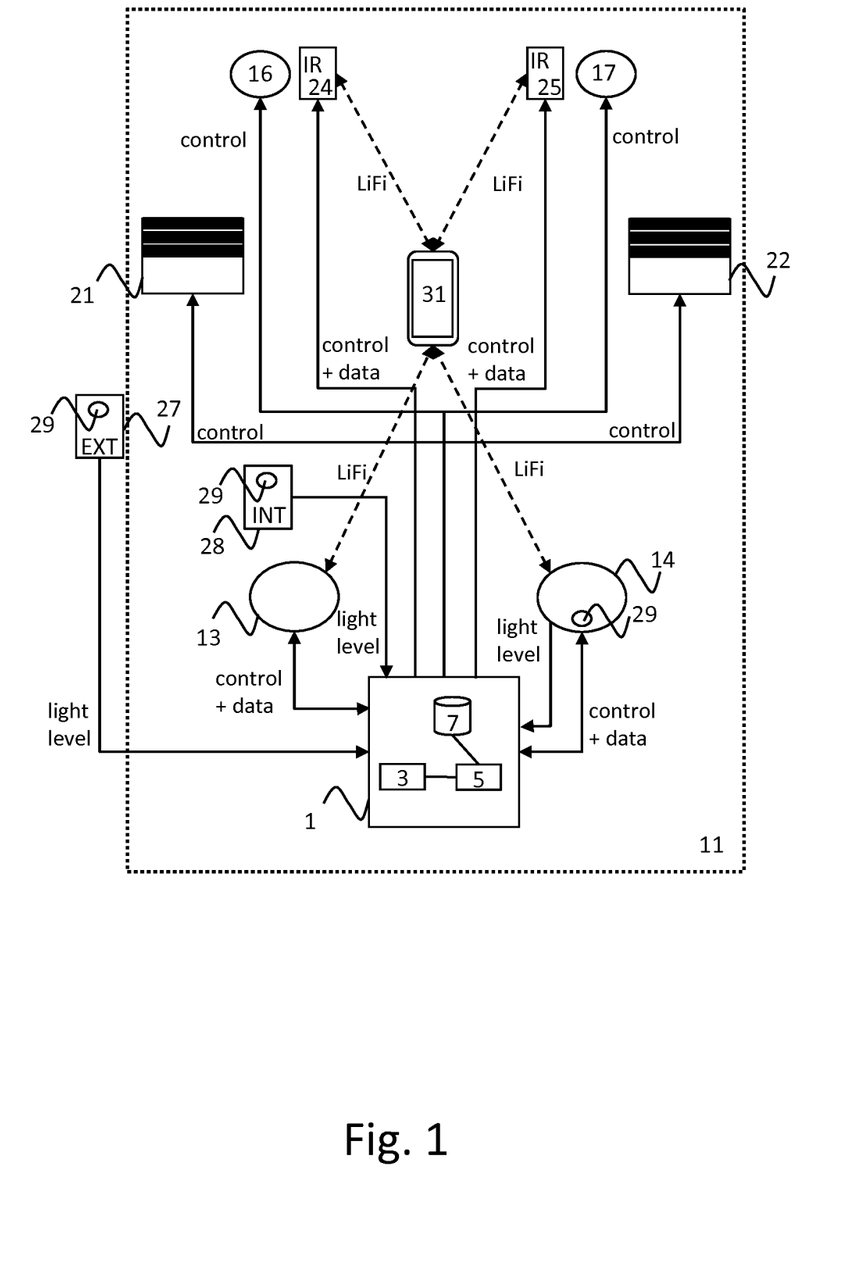
FIG. 1 is a block diagram of an embodiment of the system.

FIG. 1 shows an embodiment of the system: a controller 1. The system 1 is located in a building 11, e.g. an office building or a house. The system 1 controls two visible LiFi lights 13 and 14, two visible non-LiFi lights 16 and 17, two (non-visible) IR LiFi lights 24 and 25 and two daylight blockers 21 and 22. The daylight blockers 21 and 22 may comprises blinds or any other type of daylight blocking mechanisms, e.g. motorized curtains or switchable glass. The system 1 receives measured light levels from light sensor devices 27 and 28 and from visible LiFi light 14, which each comprise a light sensor 29. The light sensor device 28 is located inside the building 11, e.g. attached to a ceiling, and the light sensor device 27 is located outside the building 11.

In the example shown in FIG. 1, one user device, user device 31, is located in the building 11. The user device 31 accesses the Internet via the available LiFi connectivity. The user device 31 receives data from the LiFi lights 13,14, 24 and 25 and transmits data to the LiFi lights 13,14, 24 and 25, e.g. using visible light and/or InfraRed (IR) light.

The controller 1 comprises a transceiver 3, a processor 5 and a memory 7. The processor 5 is configured to obtain a target light level, determine a first set of light settings for lights 13, 14, 16, 17, 24 and/or 25 and/or a first set of daylight blocker settings for daylight blockers 21 and/or 22 based on the target light level, and control the lights 13, 14, 16, 17, 24 and/or 25 based on the first set of light settings and/or the daylight blockers 21 and/or 22 based on the first set of daylight blocker settings.

The processor 5 is further configured to receive from the user device 31 information indicating a quality of a data signal received by the user device 31 from one or more of the lights 13, 14, 24 and/or 25. The data signal is transmitted by this light or these lights by modulating a light signal. The signal quality is determined by the user device 31. In the embodiment of FIG. 1, the signal quality is measured by the user device 31. The measured signal quality may comprise a signal-to-noise ratio and/or a data rate (e.g. relative to a maximum/reference data rate), for example. Additionally, the quality of the LiFi signal may be measured and fed back to the controller 1 by stationary devices, e.g. by the lights 13, 14, 16, 17, 24 and/or 25 and/or by the light sensor devices 27 and/or 28.

The processor 5 is also configured to determine a second set of light settings for lights 13, 14, 16, 17, 24 and/or 25 based on the first set of light settings and the measured signal quality and/or a second set of daylight blocker settings for the daylight blockers 21 and/or 22 based on the first set of daylight blocker settings and the measured signal quality, and control the lights 13, 14, 16, 17, 24 and/or 25 based on the second set of light settings and/or the daylight blockers 21 and/or 22 based on the second set of daylight blocker settings.

In the embodiment of FIG. 1, the controller 1 implements the following behavior:

If LiFi is not used, then the controller 1 behaves as a conventional TLM system, i.e. maximizes daylight (energy considerations) and maintains a target light level for visible light.

If LiFi is used, then the artificial lights use a minimal brightness to achieve the desired signal quality. In some situations, this prevents the controller 1 from dimming the artificial lights even if the target light level for visible light is achieved by daylight. Depending on the system setting, the controller 1 could still achieve the target light level without exceeding it by manipulating the daylight blockers (e.g. partially closing blinds).

If the sunlight interferes with the LiFi signal, the controller 1 may treat such level of sunlight in the same way as it would treat glare—reduce the amount of external light using blinds. Interference by sunlight may cause the signal quality to degrade. The controller 1 may consider that interference by sunlight may be the cause of a degraded signal quality if a high level of daylight is detected, e.g. if the light sensor device 29 located outside the building 11 detects a high light level. The controller 1 may check if the LiFi signal improves upon taking measures such as adjusting the daylight blockers.

When enough natural light is available, the controller 1 may decide not to block daylight, e.g. to keep the blinds open, dim the (broadly illuminating) LiFi ceiling lights and brighten the (local) LiFi desk lamps for the (static) LiFi users. In this case, the global illumination is still kept according the target light level for visible light, while at a few local points, the illumination is higher for LiFi communication purposes.

The controller 1 may be connected to an Heating, Ventilation, and Air Conditioning (HVAC) system. Since air conditioning is more energy consuming than transmission of light, during very hot/sunny days it might be beneficial for the controller 1 to close the daylight blockers 21 and 22 to block heat from the sun to reduce the air conditioning usage and switch on one or more of the lights 13, 14, 16, 17, 24 and/or 25 to ensure that that the amount of light is still sufficient.

In the embodiment of the controller 1 shown in FIG. 1, the controller 1 comprises one processor 5. In an alternative embodiment, the controller 1 comprises multiple processors. The processor 5 of the controller 1 may be a general-purpose processor, e.g. ARM-based, or an application-specific processor. The processor 5 of the controller 1 may run a Unix-based operating system for example. The memory 7 may comprise one or more memory units. The memory 7 may comprise one or more hard disks and/or solid-state memory, for example. The memory 7 may be used to store the target light level, for example.

The transceiver 3 may use one or more communication technologies, e.g. Ethernet, to communicate with other devices in the building, e.g. with the lights, daylight blockers and light sensor devices. In an alternative embodiment, multiple transceivers are used instead of a single transceiver.

In the embodiment shown in FIG. 1, a receiver and a transmitter have been combined into a transceiver 3. In an alternative embodiment, one or more separate receiver components and one or more separate transmitter components are used. The controller 1 may comprise other components typical for a controller such as a power connector. The invention may be implemented using a computer program running on one or more processors.

Figure 2:
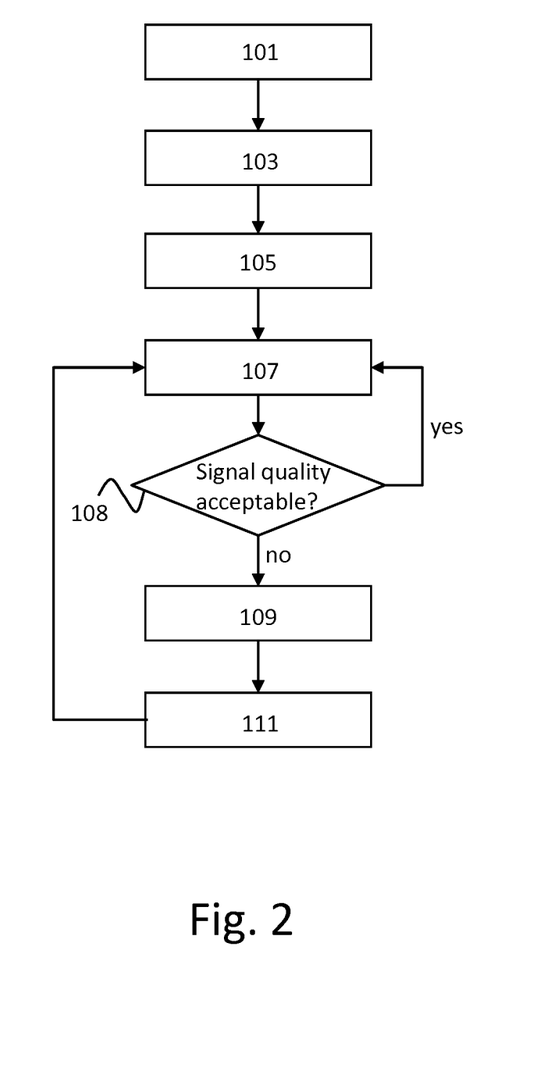
FIG. 2 is a flow diagram of a first embodiment of the method.

A first embodiment of the method of the invention is shown in FIG. 2. In this embodiment, the method does not control lights 16, 17, 24 and 25 of FIG. 1. A step 101 comprises obtaining a target light level. In this embodiment, the target light level is a target light level for visible light. A step 103 comprises determining a first set of light settings for lights 13 and 14 and a first set of daylight blocker settings for daylight blockers 21 and 22 based on the target light level. A step 105 comprises controlling the lights 13 and 14 based on the first set of light settings and the daylight blockers 21 and 22 based on the first set of daylight blocker settings.

A step 107 comprises receiving from the user device 31 information indicating a quality of a data signal received by the user device from one or more lights of the set of lights. The data signal is transmitted by modulating a light signal. The signal quality is determined by the user device 31. A step 108 comprises determining whether the determined signal quality falls in a range of acceptable values. If it does not, step 109 is performed. If it does, step 107 is repeated after a certain time.

A step 109 comprises determining a second set of light settings for the lights 13 and 14 based on the first set of light settings and the determined signal quality and a second set of daylight blocker settings for daylight blockers 21 and 22 based on the first set of daylight blocker settings and the determined signal quality. For example, if the determined signal quality is lower than desired, then the light level (i.e. brightness) of the lights 13 and 14 may be increased. By increasing the light levels of both lights by the same amount, illumination uniformity is achieved. Alternatively, only the light level of one of lights 13 and 14 is increased or the light levels of the lights 13 and 14 are increased by different amounts. A step 111 comprises controlling the lights 13 and 14 based on the second set of light settings and the daylight blockers 21 and 22 based on the second set of daylight blocker settings.

After step 111, step 107 is repeated after a certain time. In the second iteration of step 107, further information is received indicating a further signal quality of a further data signal received by the user device 31 from one or more lights of the set of lights. The further data signal is transmitted by modulating a light signal. If the user has moved in the meantime, the further signal quality is normally different from the previous signal quality. In the second iteration of step 109, third settings are determined based on the second settings and the further signal quality. In the second iteration of step 111, the third settings are used to control the lights 13 and 14 and the daylight blockers 21 and 22.

Figure 3:
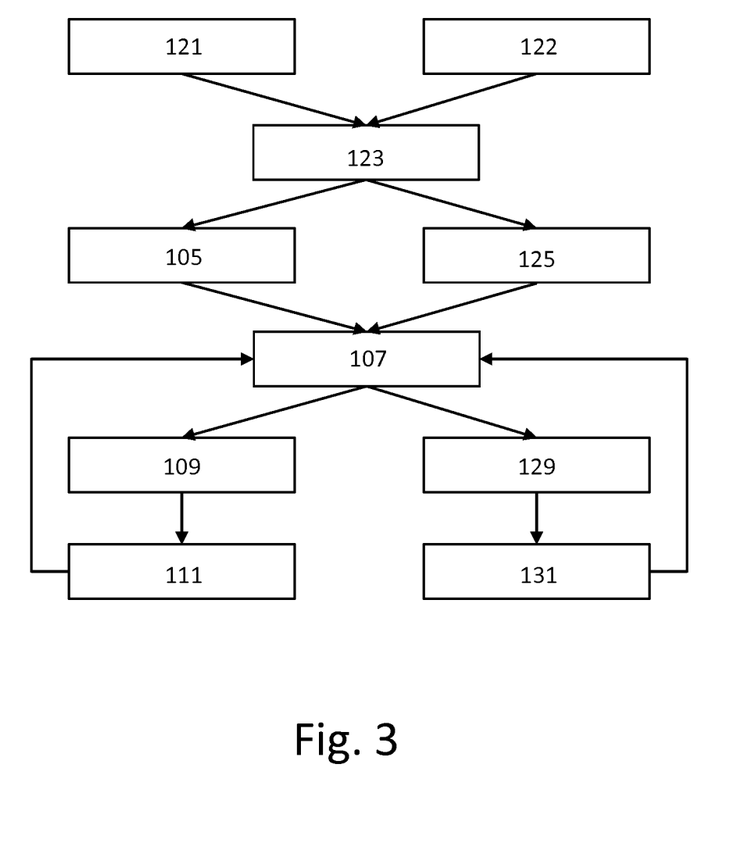
FIG. 3 is a flow diagram of a second embodiment of the method.
Figure 4:
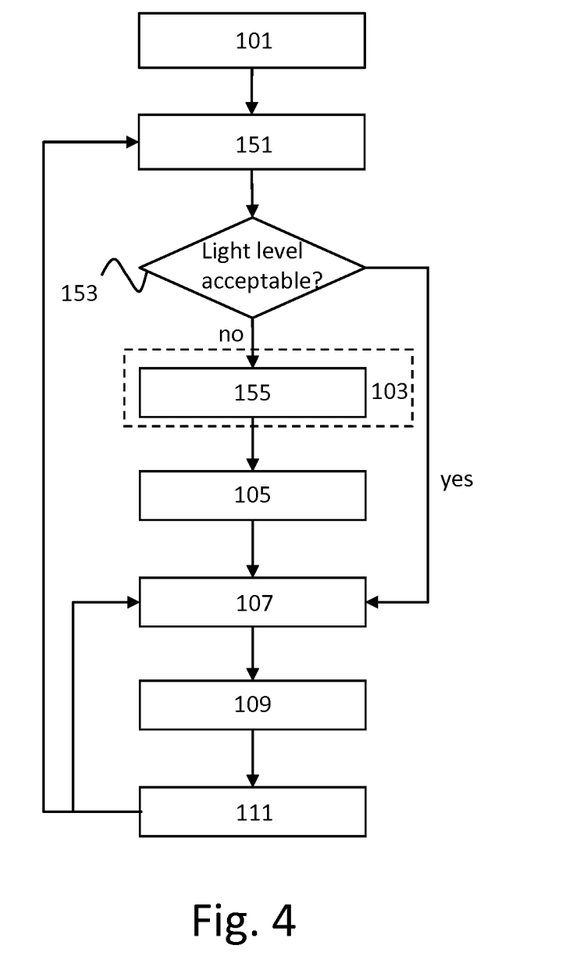
FIG. 4 is a flow diagram of a third embodiment of the method.
Figure 5:
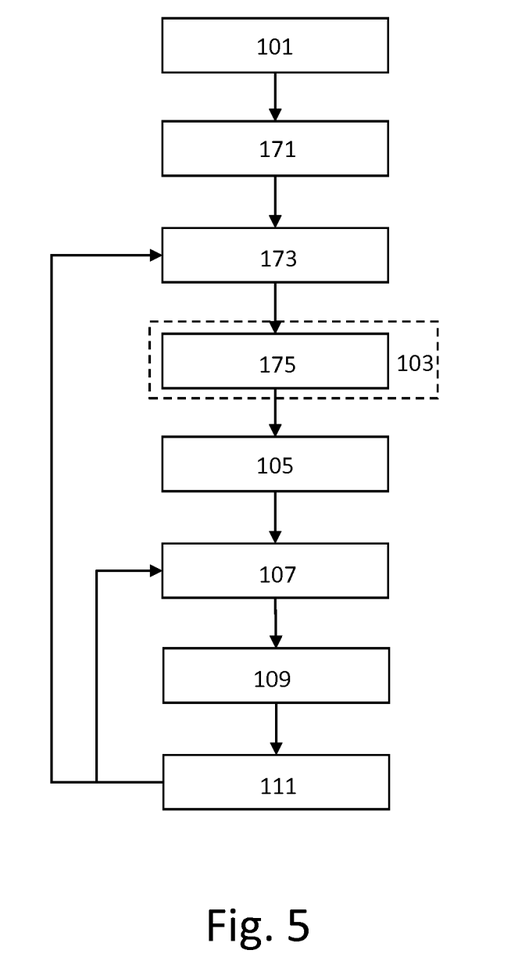
FIG. 5 is a flow diagram of a fourth embodiment of the method.

In the embodiment of FIG. 2, steps 109 and 111 are only performed if the determined signal quality received in step 107 does not fall in a range of acceptable values. In an alternative embodiment, steps 109 and 111 are always performed and step 108 is omitted. In the embodiments of FIGS. 3-5, steps 109 and 111 are always performed. In variants on the embodiments of FIGS. 3-5, these embodiments are extended with step 108 and the conditional performance of steps 109 and 111.

A second embodiment of the method of the invention is shown in FIG. 3. In this embodiment, the method does not control lights 24 and 25 of FIG. 1. Steps 121 and 122 replace step 101 of FIG. 2. Step 121 comprises obtaining a target light level for lights transmitting data. Step 122 comprises obtaining a target visible light level. Step 123 replaces step 103 of FIG. 2. Step 123 comprises determining the first set of light settings for lights 13 and 14, the first set of daylight blocker settings for daylight blockers 21 and 22, and a first set of further light settings for lights 16 and 17 based on the target light level for lights transmitting data and the target visible light level.

For example, the light settings for lights 13 and 14 may first be determined such that the target light level is achieved and next, the settings for the lights 16 and 17 and for the daylight blockers 21 and 22 may be determined such that the target visible light level is achieved. The lights 13 and 14 include only lights transmitting a data signal. The lights 16 and 17 include only lights not transmitting a data signal.

In step 105, the lights 13 and 14 are controlled based on the first set of light settings and the daylight blockers 21 and 22 are controlled based on the first set of daylight blocker settings. In step 125, the lights 16 and 17 are controlled based on the first set of further light settings. Step 107 comprises receiving from the user device 31 the information indicating the quality of the data signal, as described in relation to FIG. 2.

In step 109, the second set of light settings for the lights 13 and 14 is determined based on the first set of light settings and the determined signal quality and a second set of daylight blocker settings for daylight blockers 21 and 22 is determined based on the first set of daylight blocker settings and the determined signal quality. In step 129, a second set of further light settings for the lights 16 and 17 is determined based on the first set of further light settings and the determined signal quality.

In step 111, the lights 13 and 14 are controlled based on the second set of light settings and the daylight blockers 21 and 22 are controlled based on the second set of daylight blocker settings. In step 131, the lights 16 and 17 are controlled based on the second set of further light settings.

A third embodiment of the method of the invention is shown in FIG. 4. In this embodiment, the method does not control lights 24 and 25 of FIG. 1. Step 101 comprises obtaining a target light level. In this embodiment, the target light level is a target light level for visible light. A step 151 comprises obtaining a measured light level, e.g. from light sensor device 28 or LiFi light 14. Step 153 comprises checking whether the measured light level falls in a range of acceptable values, e.g. 390-410 lux, 580-620 lux, or 600+ lux. If it does not, steps 103 and 105 are performed. If it does, steps 103 and 105 are skipped.

In the embodiment of FIG. 4, step 103 comprises a sub step 155. Step 155 comprises determining a first set of light settings for lights 13, 14, 16, and 17 and a first set of daylight blocker settings for daylight blockers 21 and 22 based on the target light level and the measured light level. Step 105 comprises controlling the lights 13, 14, 16, and 17 based on the first set of light settings and the daylight blockers 21 and 22 based on the first set of daylight blocker settings. Lights 13 and 14 transmit a data signal and lights 16 and 17 do not transmit a data signal.

After step 105, steps 107, 109 and 111 are performed. These steps have been described in relation to FIG. 2, but they are now performed for lights 16 and 17 as well. After step 111, step 151 or step 107 is performed after a certain time. In the embodiment of FIG. 4, step 151 is performed instead of immediately proceeding with step 107 every 10th iteration. In an alternative embodiment, step 151 is performed more or less frequently or step 151 is always performed after step 111.

The benefit of separately controlling the lights based on the measured light level and controlling the lights based on the determined signal quality is that only one parameter is optimized at a time, which should normally result in an optimal setting quicker. In an alternative embodiment, settings are determined based on both the measured light level and the determined signal quality at the same time. In the embodiment of FIG. 2, steps 103 and 105 are only performed if the measured light level does not fall in a range of acceptable values. In an alternative embodiment, steps 103 and 105 are always performed and step 153 is omitted.

In a TLM system, the target visible light level is typically called set-point. The set-point is often based on the required light level on the office desk (e.g. 400 lux). The TLM system tries to optimize (minimize) the artificial light usage and use of natural lighting. In a conventional TLM system, in many situations, especially during the day and with no glare, the artificial lighting would be almost completely off, as the required light level will be achieved with natural lighting. In this situation, LiFi would not work.

In the embodiment of FIG. 4, a measured light level is compared with the set-point and the light level of one or more of the lights is adjusted to minimize the difference. If no LiFi usage is detected, no further action is necessary. If LiFi is used and the signal quality is not enough for a stable LiFi connection, then the light level of one or more of the LiFi lights needs to be increased. This increase may result in the target visible light level being exceeded. A first option is to accept that the visible light level is higher than the target light level. A second option is to compensate the increase in light level of LiFi lights. This increase may be compensated by letting the daylight blockers block more daylight and/or by decreasing the light level of non-LiFi lights.

When natural light is present, the light level (i.e. brightness) of LiFi lights typically needs to be higher than the light level if no natural light is present, due to interference by the natural light, even though the measured total light level may be the same. In the situation when bright natural light interferes with LiFi, the TLM system could resolve this in two ways: (1) by increasing the brightness of artificial light sources (will not always achieve the desired result, and not very energy efficient) or (2) adjust the blinds to reduce the amount of daylight on the deck surface. The choice to close blinds or increase brightness may depend on the energy consumption considerations and/or user preference. As previously mentioned, closing the blinds might lead to reduced energy consumption by an air conditioning system, which may compensate an increase in energy consumption due to an increase in brightness of artificial light sources.

In the embodiments of FIGS. 2 to 4, only visible lights are present. However, one or more non-visible lights may be used to transmit data signals as well. These non-visible lights may transmit InfraRed (IR) light, for example. IR-based LiFi might be preferable for higher bandwidths or due to other advantages. When IR is available for data transmission, it may be possible to avoid having to block daylight. Table 1 shows the options for potentially achieving a target visible light level of 400 lux while offering LiFi when 300 lux of daylight is present outside:

TABLE 1

| Target visible light | Visible light LiFi | Visible light non-LiFi | Daylight outside | Blocked daylight | IR LiFi | Result |
|---|---|---|---|---|---|---|
| 400 | 100 | 0 | 300 | 0 | No | 400, no LiFi (too weak) |
| 400 | 200 | 0 | 300 | −100 | No | 400, LiFi |
| 400 | 0 | 100 | 300 | 0 | Yes | 400, LiFi |

With the settings shown in the first row of Table 1, it is not possible to offer LiFi, because LiFi requires at least 200 lux in this scenario and the one or more lights that transmit a data signal use a light level of only 100 lux. The second row of Table 1 solves this problem by letting the one or more lights that transmit a data signal use a light level of 200 lux. Since these 200 lux in combination with the 300 lux of the daylight would exceed 400 lux, 100 lux of daylight is blocked. Alternatively, one or more IR lights may be used to transmit a data signal. In this case, lights that do not transmit a data signal can use a light level of 100 lux and no daylight blocking is needed, as shown in the third row of Table 1.

Since daylight may interfere with the IR lights, it may not be possible to prevent the use of daylight blockers in all situations, e.g. when the sunlight is strong. Table 2 shows the options for potentially achieving a target light level of 600 lux while offering LiFi when 1000 lux of daylight is present outside:

TABLE 2

| Target visible light | Visible light LiFi | Visible light non-LiFi | Daylight outside | Blocked daylight | IR LiFi | Result |
|---|---|---|---|---|---|---|
| 600 | 0 | 0 | 1000 | −400 | Yes | 600, no LiFi (interference) |
| 600 | 200 | 0 | 1000 | −600 | No | 600, LiFi |
| 600 | 0 | 300 | 1000 | −700 | Yes | 600, LiFi |

With the settings shown in the first row of Table 2, it is not possible to offer LiFi, because blocking 400 lux of daylight is not sufficient, and the strong sunlight still interferes with the IR based communication. The third row of Table 2 shows that by blocking 700 lux of daylight and by letting lights that do not transmit a data signal use a light level of 300 lux, the target visible light level may be achieved without interference. An alternative option involves letting one or more lights that transmit a data signal use a light level of 200 lux instead of using IR LiFi lights. This is shown in the second row of Table 2. In this case, 600 lux of daylight needs to be blocked.

Even if no IR LiFi lights are used (which are used for downlink communication), IR may be used to let user devices perform uplink communication, e.g. with visible lights that comprise an IR receiver. IR is the most preferred way of communication for the uplink. When a visible light communication (VLC) based downlink and an IR based uplink is used, the TLM system may still need to use the daylight blockers to reduce interference from the daylight.

A fourth embodiment of the method of the invention is shown in FIG. 5. In this more advanced embodiment, the position and activity of non-LiFi users and LiFi users (and their LiFi devices) is taken into account. In this way, both the lighting conditions and the LiFi signal conditions can be optimized at those positions. Optionally, those conditions are dynamically adapted based on the users detected current (digital) activities or current visual attention.

Step 101 comprises obtaining a target light level. In this embodiment, the target light level is a target light level for visible light. Next, a step 171 is performed. Step 171 comprises determining one or more user device positions of and/or for one or more user devices receiving the data signal and/or one or more user device positions of and/or for one or more user devices not receiving the data signal. The positions of the user devices receiving the data signal, e.g. user device 31, may be used to determine at which positions LiFi needs to be received and which positions needs to be illuminated.

The positions of the user devices not receiving the data signal may be used to determine which positions needs to be illuminated. If the positions of the user devices cannot (all) be determined, typical positions for user devices may be used, e.g. LiFi connectivity may be needed in meeting rooms and illumination may be needed in offices.

Next, step 173 comprises determining one or more positions of the lights 13, 14, 16, 17, 24 and 25 and the daylight blockers 21 and 22, which are referred to as light transmission positions to distinguish them from the user device positions. In the embodiment of FIG. 5, steps 103 of FIG. 1 comprises a sub step 175. Step 175 comprises determining the first set of light settings for the lights 13, 14, 16, 17, 24 and 25 and the first set of daylight blocker settings for the daylight blockers 21 and 22 based on the target light level, the determined one or more user device positions and the determined one or more light transmission positions.

Thus, visible lights can be selected that are able to illuminate current and/or expected user device positions and LiFi-capable lights can be selected that are near current and/or expected positions of user devices receiving the data signal. Step 105 comprises controlling the lights 13, 14, 16, 17, 24 and 25 based on the first set of light settings and the daylight blockers 21 and 22 based on the first set of daylight blocker settings.

After step 105, steps 107, 109 and 111 are performed. These steps have been described in relation to FIG. 2, but they are now performed for lights 16, 17, 24 and 25 as well. After step 111, step 173 or step 107 is performed after a certain time. In the embodiment of FIG. 5, step 173 is performed instead of immediately proceeding with step 107 every 10th iteration. In an alternative embodiment, step 173 is performed more or less frequently or step 173 is always performed after step 111.

Figure 6:
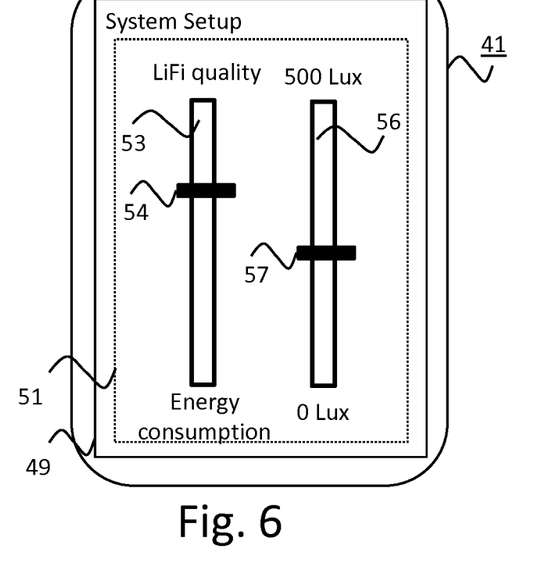
FIG. 6 shows an example of a user interface for configuring the system.

FIG. 6 shows an example of a user interface 51 for configuring the system. The user interface 51 is part of an application used by a manager of a building or a home owner on his mobile device 41. The user interface is displayed on a display 49. In this example, the user can configure two aspects of the system: a target visible light level 56 with a slider 57 and a LiFi quality vs. energy consumption setting 53 with a slider 54.

If the user specifies that LiFi quality is more important than energy consumption, the artificial lights will be used more, possibly in combination with daylight blockers, even when sufficient daylight is present to achieve the target light level. If the user specifies that LiFi quality has priority, the specified target visible light level may be considered to be a minimum visible light level that is exceeded when necessary for a good LiFi quality. Settings may be configured per building, per room or per group of rooms, for example.

Figure 7:
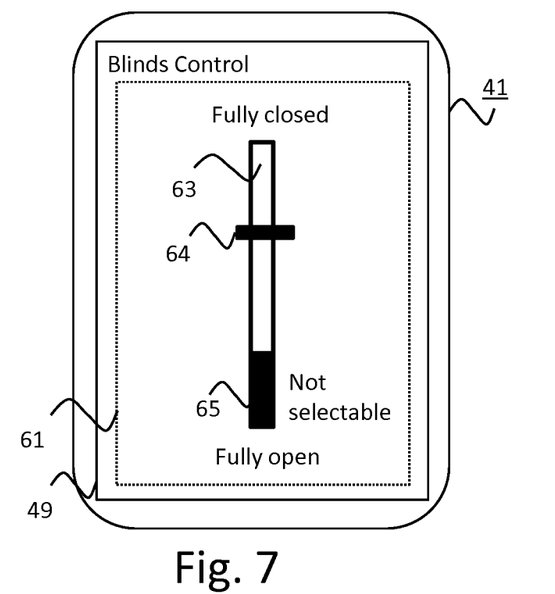
FIG. 7 shows an example of a user interface for manually controlling blinds.

FIG. 7 shows an example of a user interface 61 for manually controlling daylight blockers, blinds in particular. This user interface 61 can be used to prevent a user from decreasing the amount of light blocked by the daylight blockers upon determining that decreasing the amount of light blocked by the daylight blockers would result in the signal quality of the data signal falling below a target level.

Normally, a user would be able to fully open the blinds or fully close the blinds or partly close the blinds by selecting a blind setting 63 with a slider 64. In the user interface 61, blind settings in region 65 have been marked and are not selectable. Thus, it is not possible for the user to fully open the blinds, because this could (potentially) impact the quality of the LiFi signal.

In an alternative user interface, region 65 would also be marked, but the user would still be able to choose blind settings from region 65, i.e. the region 65 has only been marked as a warning. The same user interface may be used to manually control other types of daylight blockers or to control light settings, e.g. the dim level of the lights.

Figure 8:
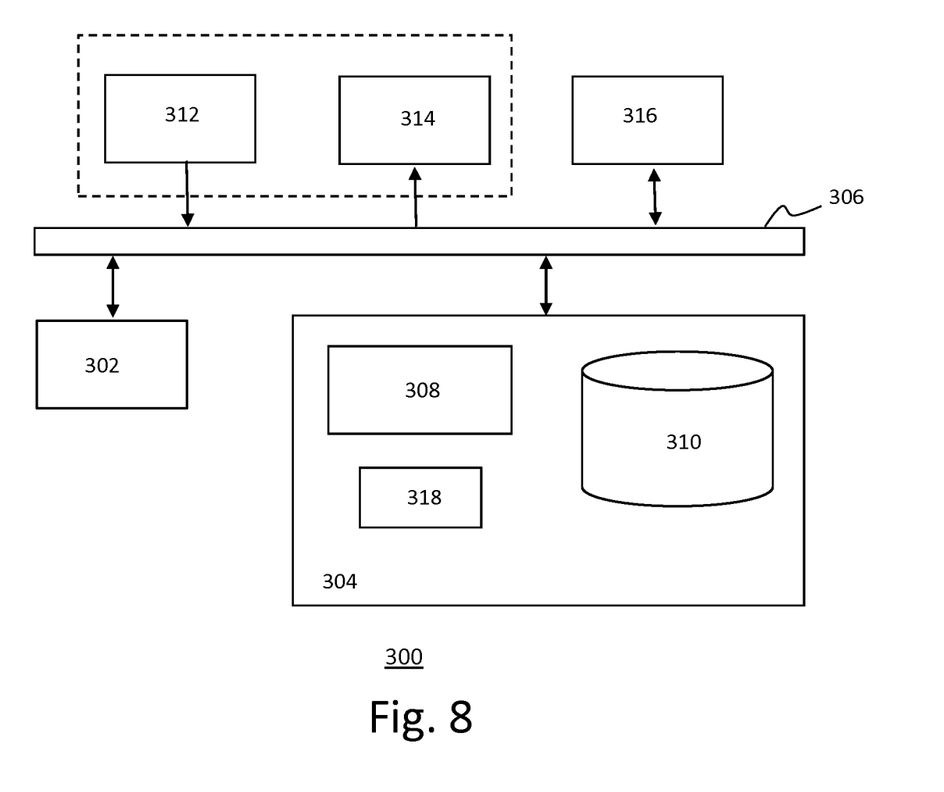
FIG. 8 is a block diagram of an exemplary data processing system for performing the method of the invention.

FIG. 8 depicts a block diagram illustrating an exemplary data processing system that may perform the method as described with reference to FIGS. 2-5.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining light settings and/or daylight blocker settings based on a quality of a data signal received from one or more of a set of one or more lights, comprising at least one processor configured to:
   obtain a target light level,
   determine a first set of light settings for said set of one or more lights and/or a first set of daylight blocker settings for a set of one or more daylight blockers based on said target light level,
   control said set of lights based on said first set of light settings and/or said set of daylight blockers based on said first set of daylight blocker settings,
   receive from a user device information indicating the quality of the data signal received by said user device from said one or more lights of said set of lights, said data signal being transmitted by modulating a light signal and said signal quality being determined by said user device,
   determine a second set of light settings for said set of lights based on said first set of light settings and said determined signal quality and/or a second set of daylight blocker settings for said set of daylight blockers based on said first set of daylight blocker settings and said determined signal quality, and
   control said set of lights based on said second set of light settings and/or said set of daylight blockers based on said second set of daylight blocker settings.

2. A system as claimed in claim 1, wherein said determined signal quality comprises a signal-to-noise ratio and/or a data rate.

3. A system as claimed in claim 1, wherein said at least one processor is configured to:
   receive from said user device further information indicating a further signal quality of a further data signal received by said user device from one or more lights of said set of lights, said further data signal being transmitted by modulating a light signal,
   determine a third set of light settings for said set of lights based on said first second of light settings and said further signal quality and/or determine a third set of daylight blocker settings for said set of daylight blockers based on said second set of daylight blocker settings and said further signal quality, and
   control said set of lights based on said third set of light settings and/or said set of daylight blockers based on said third set of daylight blocker settings.

4. A system as claimed in claim 1, wherein said set of lights comprises at least one non-visible light.

5. A system as claimed in claim 4, wherein said at least one non-visible light is configured to emit infrared light.

6. A system as claimed in claim 1, wherein said set of lights include only lights transmitting a data signal.

7. A system as claimed in claim 6, wherein said at least one processor is configured to:
obtain a target visible light level,
determine said first set of light settings for said set of one or more lights and a first set of further light settings for a further set of one or more lights based on said target light level and said target visible light level, said further set of lights including only lights not transmitting a data signal,
control said further set of lights based on said first set of further light settings,
determine a second set of further light settings for said further set of lights based on said first set of further light settings and said determined signal quality, and
control said further set of lights based on said second set of further light settings.

8. A system as claimed in claim 1, wherein said set of lights include at least one light transmitting a data signal and at least one light not transmitting a data signal.

9. A system as claimed in claim 1, wherein said at least one processor is configured to control said set of daylight blockers, said at least one processor is configured to prevent a user from decreasing the amount of light blocked by said set of daylight blockers upon determining that decreasing the amount of light blocked by said set of daylight blockers would result in said signal quality of said data signal falling below a target level.

10. A system as claimed in claim 1, wherein said at least one processor is configured to:
obtain a measured light level, and
determine said first set of light settings for said set of lights, said first set of light settings for said further set of lights, and/or said first set of daylight blocker settings for said set of daylight blockers further based on said measured light level.

11. A system as claimed in claim 10, wherein said at least one processor is configured to:
control said set of lights based on said first set of light settings and/or said set of daylight blockers based on said first set of daylight blocker settings upon determining that said measured light level does not fall in a range of acceptable values.

12. A system as claimed in claim 1, wherein said at least one processor is configured to:
control said set of lights based on said second set of light settings and/or said set of daylight blockers based on said second set of daylight blocker settings upon determining that said determined signal quality does not fall in a range of acceptable values.

13. A system as claimed in claim 1, wherein said at least one processor is configured to:
determine one or more user device positions of one or more user devices receiving said data signal and/or one or more user device positions of one or more user devices not receiving said data signal,
determine one or more light transmission positions of one or more lights of said set of lights and/or of one or more daylight blockers of said set of daylight blockers, and
determine said first set of light settings for said set of lights, said first set of light settings for said further set of lights and/or said first set of daylight blocker settings for said set of daylight blockers further based on said determined one or more user device positions and said determined one or more light transmission positions.

14. A method of determining light settings and/or daylight blocker settings based on a quality of a data signal received from one or more of a set of one or more lights, comprising:
obtaining a target light level;
determining a first set of light settings for said set of one or more lights and/or a first set of daylight blocker settings for a set of one or more daylight blockers based on said target light level;
controlling said set of lights based on said first set of light settings and/or said set of daylight blockers based on said first set of daylight blocker settings;
receiving from a user device information indicating the quality of the data signal received by said user device from said one or more lights of said set of lights, said data signal being transmitted by modulating a light signal and said signal quality being determined by said user device;
determining a second set of light settings for said set of lights based on said first set of light settings and said determined signal quality and/or a second set of daylight blocker settings for said set of daylight blockers based on said first set of daylight blocker settings and said determined signal quality; and
controlling said set of lights based on said second set of light settings and/or said set of daylight blockers based on said second set of daylight blocker settings.

15. A computer program product for a computing device, the computer program product comprising computer program code to perform the method of claim 14 when the computer program product is run on a processing unit of the computing device.

* * * * *